United States Patent [19]

Gotoh et al.

[11] Patent Number: 4,816,386

[45] Date of Patent: Mar. 28, 1989

[54] NEAR-INFRARED SENSITIVE PHTHALOCYANINE-POLYMER COMPOSITIONS

[75] Inventors: Tetsuya Gotoh; Tosiyuki Kondoh; Mutsuo Aoyagi, all of Otsu, Japan

[73] Assignee: Toray Industries, Inc., Otsu, Japan

[21] Appl. No.: 303

[22] Filed: Jan. 5, 1987

[30] Foreign Application Priority Data

Jan. 13, 1986 [JP]  Japan ................................ 61-3672
Mar. 20, 1986 [JP] Japan ................................ 61-60778

[51] Int. Cl.$^4$ .......................... G11B 7/24; G01D 9/00; G03C 1/72
[52] U.S. Cl. .................................... 430/495; 430/944; 430/945; 430/964; 346/135.1; 524/88
[58] Field of Search ............... 430/945, 964, 495, 944; 346/135.1; 524/88

[56] References Cited

U.S. PATENT DOCUMENTS

| | | | |
|---|---|---|---|
| 3,923,730 | 12/1975 | Pugin ..................... | 524/88 |
| 4,241,355 | 12/1980 | Bloom et al. ............. | 346/135.1 |
| 4,311,623 | 1/1982 | Supcoe .................... | 524/88 |
| 4,311,775 | 1/1982 | Regan ...................... | 430/37 |
| 4,347,173 | 8/1982 | Merian et al. ............ | 524/88 |
| 4,426,434 | 1/1984 | Arishima et al. ......... | 430/945 |
| 4,492,750 | 1/1985 | Law et al. ................ | 430/945 |
| 4,529,688 | 7/1985 | Law et al. ................ | 430/945 |
| 4,605,607 | 8/1986 | Nikles et al. ............. | 430/945 |

FOREIGN PATENT DOCUMENTS

291187 12/1986 Japan .

OTHER PUBLICATIONS

The Journal of Phys. Chem., "Spectroscopic Characterization of a New Polymorph of Metal-Free Phthalocyanine", Sharp et al., pp. 3230–3235, vol. 72, No. 9, Sep. 1968.
Thin Solid Films, vol. 106 (1983), pp. 291–301, "Solvent-Induced Dimorphic Transformation in Magnesium Phthalocyanine and its Effect on the Photoactivity".
J. Am. Chem. Soc., 1984, vol. 106, pp. 4706–4711, Snow et al.
A. R. Monahan, J. A. Brado and A. F. DeLuca, The Association of Copper (II), Vanadyl, and Zine (II) 4,4',4", 4 -Tetraalkylphthalocyanine Dyes in Benzene, The Journal of Physical Chemistry, vol. 76, No. 14, 1972.
J. Phys. Chem. 1985, 89, 2652–2657, Kock-Yee Law.
Journal of Imaging Science, vol. 29, No. 4, 1985, p. 148.
Denshishashin Gakkai-Shi, vol. 25, No. 3, 1986.
The Chemical Society of Japan, 1986, No. 3, p. 393.
Optics and Spectroscopy, 1967, p. 170, Lebedev et al.

Primary Examiner—Paul R. Michl
Assistant Examiner—Mark R. Buscher
Attorney, Agent, or Firm—Wegner & Bretschneider

[57] ABSTRACT

A novel near-infrared sensitive phthalocyanine-polymer composition comprises a substituted aluminum phthalocyanine and a polymer wherein substituted aluminum phthalocyanine dimers and/or dimer aggregates which are responsible to the near-infrared sensitivity, are included.

The near-infrared sensitive phthalocyanine-polymer composition has useful characteristics:

(A) when the near-infrared sensitive phthalocynaine-polymer composition is heated above the $T_g$ (Glass Transition Temperature) of the polymer either by direct heating and by absorbing irradiated light energy, optical properties of said near-infrared sensitive phthalocyanine-polymer composition; absorbance and/or reflectivity, are capable of being changed, (B) the thermal change of optical properties of the near-infrared sensitive phthalocyanine-polymer composition can be fixed by further heating above the $T_f$ (Thermal Fixation Temperature) higher than the $T_g$ of the polymer, (C) said near-infrared sensitive phthalocyanine-polymer composition is capable of being insolubilized to a solvent by heating above the $T_f$, (D) said near-infrared sensitive phthalocyanine-polymer compositions both of unheated and heated above the $T_f$ are very stable and of long life.

7 Claims, 8 Drawing Sheets

NEAR-INFRARED SENSITIVE PHTHALOCYANINE-POLYMER COMPOSITIONS

This invention is generally directed to near-infrared sensitive materials, and more particularly, the present invention relates to certain novel substituted aluminum phthalocyanine-polymer compositions which are sensitive to near-infrared wavelengths and thus are useful with solid-state diode laser systems.

BACKGROUND OF THE INVENTION

There is a strong demand for the development of near-infrared sensitive materials for use in optical information processing and semi-conductor device manufacturing processes.

Such optical information processing includes, for example, high-speed laser-beam printers and optical information storage systems.

To make custom-made semi-conductor devices, near-infrared sensitive photoresists are required for use with computer-aided solid-state diode laser-beam exposure systems.

As the light sources in near-infrared wavelengths, solid-state diode lasers are widely used because of ease of availability. These lasers, including a gallium aluminum arsenide laser, mostly operate in wavelengths from 750 to 870 nm(nanometers). Thus the near-infrared sensitive materials must have high sensitivity in these wavelengths.

Furthermore, for the purpose mentioned above, the materials must be able to be applied to form thin, smooth films of high mechanical strength, high adhesiveness to the given substrate, and high optical quality.

Phthalocyanine compounds are known to be of very low toxicity, thermally and photochemically stable. And their crystals are able to be converted into a near-infrared sensitive form from the near-infrared insensitive form.

Some near-infrared sensitive materials containing phthalocyanine crystal in a near-infrared sensitive form dispersed in a polymer binder are already known.

For example, there is disclosed in Journal of Imaging Science, Vol. 29, No. 4, 1985, page 148, a near-infrared photoreceptor device incorporating chloroindium phthalocyanine wherein the charge photogenerator layer contains chloroindium phthalocyanine dispersed in Vitel PE-200 (Goodyear) polyester resin. The near-infrared sensitivity of the chloroindium phthalocyanine is based on the formation of dimers as building units in the microcrystals. The microcrystals are obtained by ball milling the near-infrared insensitive chloroindium phthalocyanine crystal in the presence of the solvent methylene chloride and the polyester resin.

There is disclosed in U.S. Pat. No. 4,529,688 an ablative infrared sensitive optical recording composition containing as a component thereof a dispersion of a resinous binder and an absorbing infrared sensitive tertiarybutyl substituted vanadyl phthalocyanine obtained by a solvent vapor treatment which causes recrystallization of the phthalocyanine so as to be infrared absorbing. The ablative recording medium, however, requires an air-sandwiched optical disk structure in order to provide a space that can absorb evaporized or sublimed recording material. To fabricate such a complicated disk structure, time-consuming and thus costly processes are required.

Titanylphthalocyanine photoreceptor devices are disclosed in DENSHISHASHIN GAKKAI-SHI, Vol. 25, No. 3, 1986, wherein the infrared sensitive charge generator layer consists of infrared sensitive alphatitanylphthalocyanine microcrystals dispersed in the resinous binder.

Additionally, there is reported in The Chemical Society of Japan, 1986, No. 3, page 393, a magnesium phthalocyanine-polyester dispersed type photoreceptor which is sensitive to laser diode light. The near-infrared sensitive magnesium phthalocyanine of a new morphological structure is prepared by recrystallization from a strong electron donative solvent such as morpholine.

All of the above near-infrared sensitive materials containing phthalocyanine compounds belong to a class of dispersed type compositions. Thus, they have small particles of phthalocyanine crystals dispersed therein, meaning that they are not of high homogeneity or of high optical quality. More particularly stated, they are not highly absorbing at near-infrared wavelengths due to light scattering caused by the small phthalocyanine particles.

A near-infrared sensitive material must be substantially homogeneous and of high optical quality to be truly useful. Therefore, the phthalocyanine compound being used to this aim must be very soluble into a solvent and a binder polymer, and yet be sensitive at near-infrared wavelengths when it is incorporated in the composition, although the phthalocyanine molecule itself is not sensitive at these wavelengths.

SUMMARY OF THE INVENTION

It is an object of the present invention to provide near-infrared sensitive phthalocyanine-polymer compositions having high homogeniety and high optical quality.

It is a further object of the present invention to provide near-infrared sensitive phthalocyanine-polymer compositions which have a sensitivity to wavelengths from 750 to 870 nm.

A still further object of the present invention is to provide near-infrared sensitive phthalocyaninepolymer compositions wherein the optical properties of said phthalocyanine-polymer compositions, namely, absorbance and/or reflectivity, are capable of being thermally changed.

An another object of the present invention is to provide near-infrared sensitive phthalocyanine-polymer compositions wherein the changes of the optical properties of said phthalocyanine-polymer compositions are capable of being thermally fixed.

An another object of the present invention is to provide near-infrared sensitive phthalocyanine-polymer compositions wherein the thermal change of the optical properties and the thermal fixation of the thermal change of the optical properties occur at "threshold temperatures". By the expression "threshold temperatures" is meant that no change of the optical properties or no fixation of the change of the optical properties will occur below these critical tmperatures no matter the length of time during which the phthalocyanine-polymer compositions are heated.

An another object of the present invention is to provide near-infrared sensitive phthalocyanine-polymer compositions which are capable of being thermally insolubilized by heating into a solvent.

A further object of the present invention is to provide near-infrared sensitive phthalocyanine-polymer compositions which are thermally and photochemically stable enough to be used as archival optical information recording media on which information can be recorded by means of solid state diode lasers.

An another object of the present invention is to provide near-infrared sensitive phthalocyanine-polymer compositions which can be used as optical information recording media on which information can be recorded not by ablation but by the fixation of the thermal change of the optical properties thereof.

We have found that near-infrared sensitive phthalocyanine-polymer compositions comprising a substituted aluminum phthalocyanine and a polymer, wherein dimer and/or dimers aggregates of said substituted aluminum phthalocyanine are responsible to near-infrared sensitivity, meet all the above objects.

BRIEF DESCRIPTION OF THE DRAWINGS

The invention will be described in detail with reference to the drawings, in which

FIG. 6(a) shows the relationship between temperature and change of absorbance at 830 nm.

DETAILED DESCRIPTION OF THE INVENTION

It is well known that the nature of the metallophthalocyanine, such as solubility and stability, greatly depends on the central metal therein.

We have found that the phthalocyanines having central aluminum derivatives are particularly suitable for use in preparing near-infrared sensitive phthalocyanine-polymer compositions.

A substituted aluminum phthalocyanine has sufficiently high solubility in an organic solvent, and furthermore, strong tendency to form dimers and/or dimer aggregates which are responsible to the sensitivity in the near-infrared wavelengths.

In solution, the dimer formation of haloaluminum phthalocyanines is reported in Optics and Spectroscopy, 1967, page 170, which suggests that the dimer structure results from an aluminum-halogen(s)-aluminum linkage.

We have found that in certain appropriate polymer matrices not only haloaluminum phthalocyanines but also other substituted aluminum phthalocyanines are capable of forming dimers and/or dimer aggregates.

Molar absorption coefficients of substituted aluminum phthalocyanine dimers at 830 nm were measured and found to be values between $6 \times 10^4$ and $9 \times 10^4$ liter.-mole$^{-1}$.cm$^{-1}$. These large values mean that a composition only 1 micron thick and containing 15% by weight of the phthalocyanine will absorb about 90% of energy of incident light at 830 nm.

Substituted aluminum phthalocyanines which can be preferably used in the present invention have the formula wherein X is selected from the group consisting of chlorine bromine, hydroxy, alkoxy from $C_1$ to $C_4$ or carbonyloxy from $C_1$ to $C_4$, and $Y_1$, $Y_2$, $Y_3$ and $Y_4$ are selected from the group consisting of hydrogen, chlorine, bromine, hydroxy, alkyl from $C_1$ to $C_6$, hydroxyalkyl from $C_1$ to $C_6$, alkoxy from $C_1$ to $C_6$, amino, amide from $C_1$ to $C_6$, nitro, cyano and/or carbonyl from $C_1$ to $C_4$.

It is also very important to use such a polymer that allows or helps the formation of dimers and/or dimer aggregates of substituted aluminum phthalocyanine therein. The role of the polymer is not limited to the above. We have found that the polymer having at least one component capable of forming hydrogen bonding stabilizes the dimer structure, and determines the temperatures of dimer destruction and fixation of the change of optical properties of the composition.

A preferable polymer to be used in this invention is selected from the group consisting of poly(vinylalcohol), poly(vinylacetal), hydroxyalkyl cellulose, acetyl cellulose, poly(succharide), poly(vinylpyridine), poly(vinylpyrrolidone), polyepoxide, poly(bis-epoxide), polyurethane, polyamide, or their copolymers.

To prepare a near-infrared sensitive substituted aluminum phthalocyanine-polymer composition from the preferable substituted aluminum phthalocyanine and polymer mentioned above, it is imortant to control the solubility of the substituted aluminum phthalocyanine when the composition is being formed from the wet state with solvent.

Figure 1:
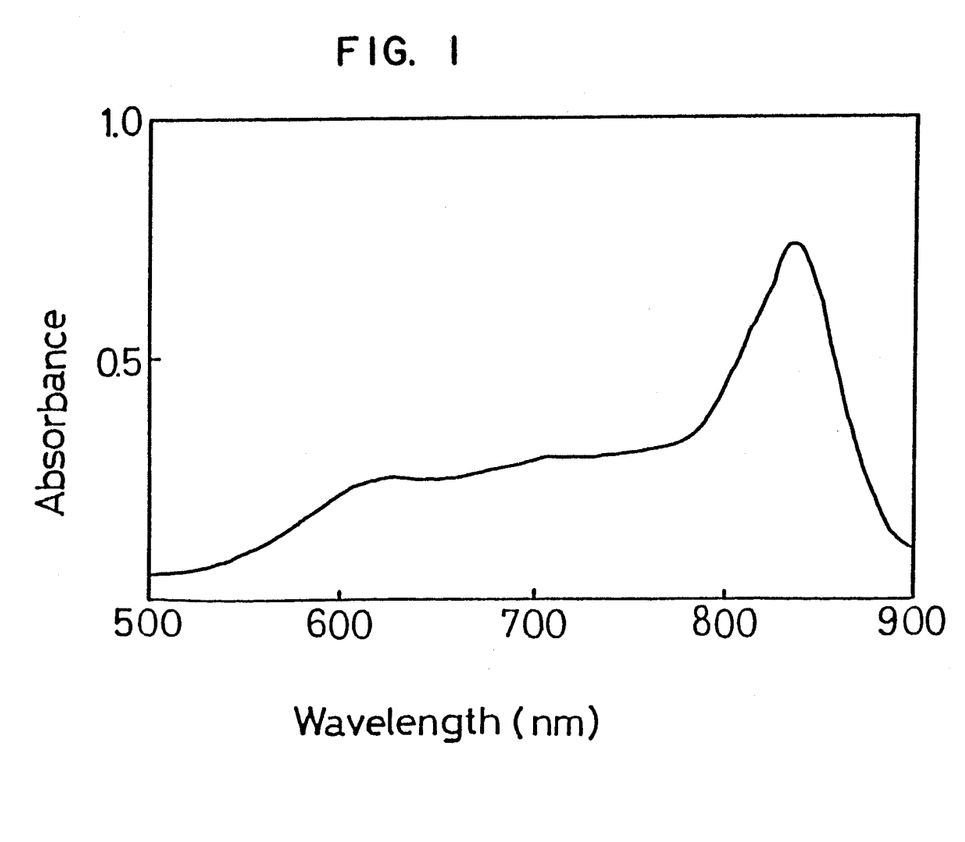
FIG. 1 shows a visible-near-infrared absorption spectrum of the chloroaluminum phthalocyanine-poly(vinylalcohol) composition prepared by coating a solution of said chloroaluminum phthalocyanine and said poly(vinylalcohol) in a mixed solvent of ethyl alcohol and water (1:1 in volume).

The chloroaluminum phthalocyanine-poly(vinylalcohol) composition prepared by coating on a substrate solution in a mixed solvent of ethyl alcohol and water (1:1 in volume) which is a very good solvent to said poly(vinylalcohol) and a solvent of not so high solubilizing power to chloroaluminum phthalocyanine does show strong absorption in near-infrared wavelengths (FIG. 1).

Figure 2:
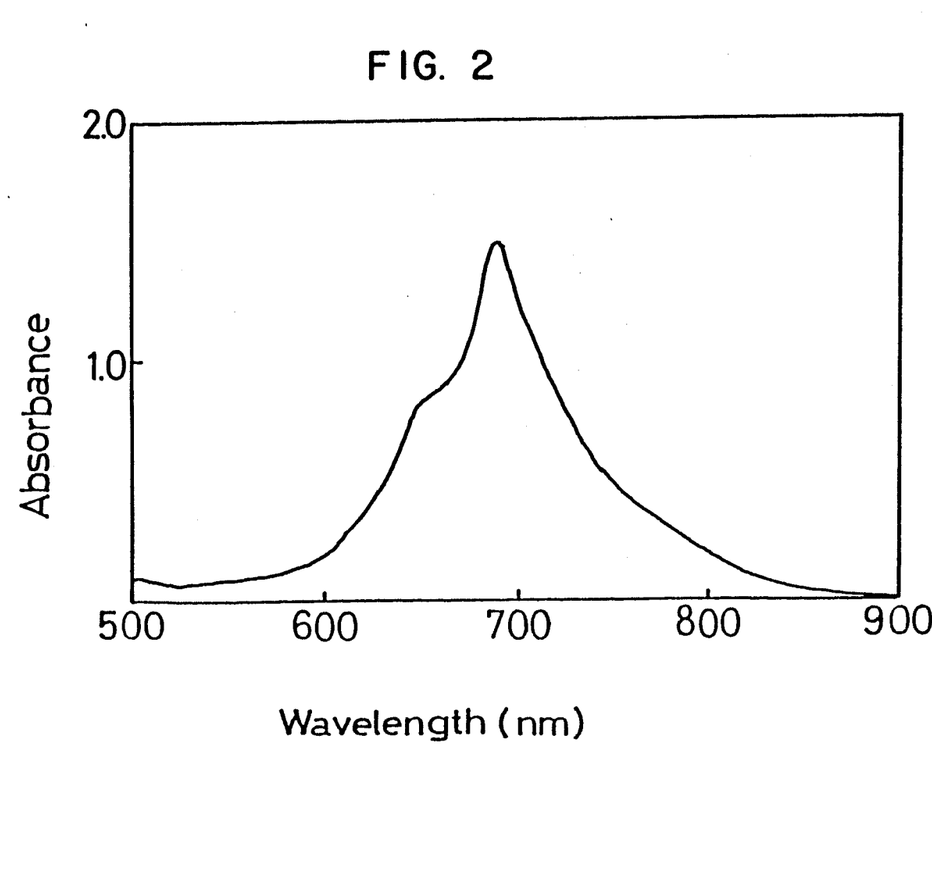
FIG. 2 shows a visible-near-infrared absorption spectrum of the chloroaluminum chlorophthalocyanineacetyl cellulose composition prepared by coating a solution of said chloroaluminum chlorophthalocyanine and said acetyl cellulose in dimethylformamide.

In contrast to the above result, chloroaluminum chlorophthalocyanine-acetyl cellulose composition prepared by coating a solution in dimethylformamide, which is a very good common solvent both to the chloroaluminum chlorophthalocyanine and the acetyl cellulose, does not show strong absorption in near-infrared wavelengths (FIG. 2).

By employing a poor solvent of chloroaluminum chlorophthalocyanine, water, together with the common good solvent dimethylformamide, we can prepare the composition containing dimer and/or dimer aggregates of chloroaluminum chlorophthalocyanine.

Figure 3:
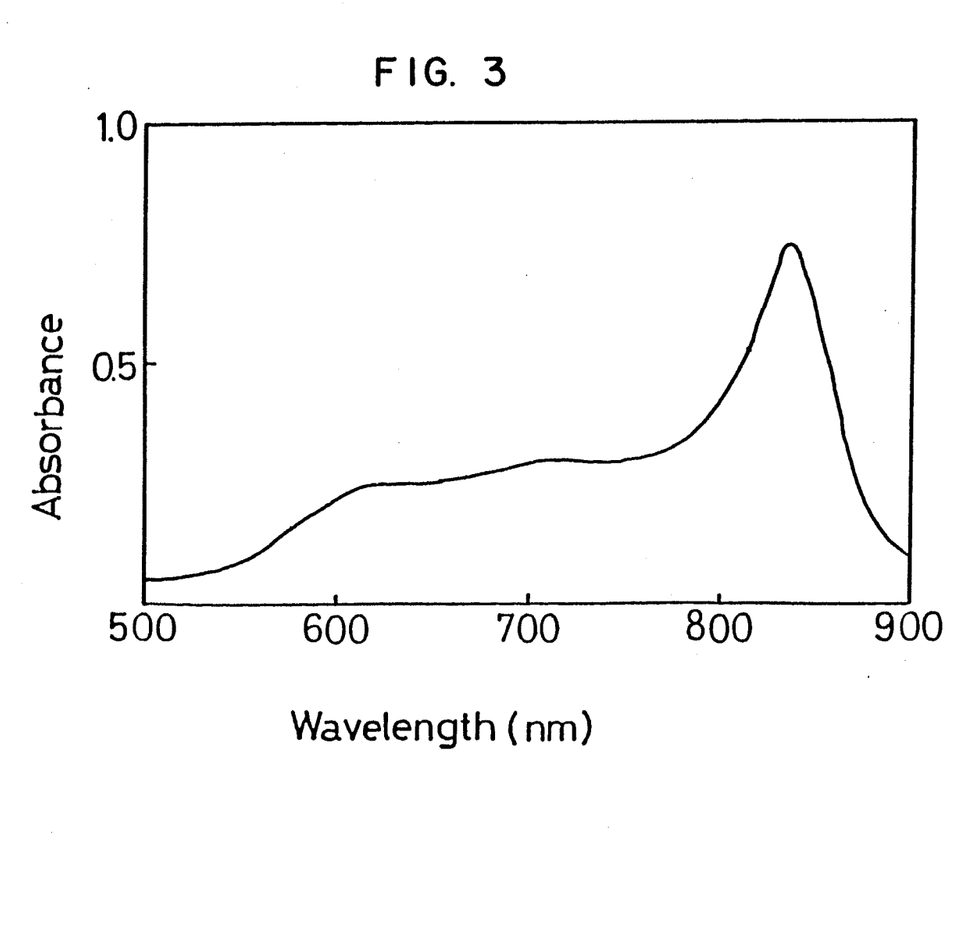
FIG. 3 shows a visible-near-infrared absorption spectrum of the chloroaluminum chlorophthalocyanineacetyl cellulose composition prepared by coating a solution of said chloroaluminum chlorophthalocyanine and said poly(vinylalcohol) in a mixed solvent of dimethylformamide and water (1:1 in volume).

The chloroaluminum chlorophthalocyanine-acetyl cellulose composition prepared by coating a substrate with a solution thereof in dimethylformamide and water (1:1 in volume) mixed solvent, which is a good solvent to acetyl cellulose and a moderately good solvent to chloroaluminum chlorophthalocyanine, does show a strong absorption in near-infrared wavelengths (FIG. 3).

The suitable solvent in this invention may be a single solvent or a mixed solvent prepared from two or more solvents. A good to moderately good solvent may be selected from the group consisting of dimethylsulfoxide, dimethylformamide, N-methylpyrolidone and pyridine, alcohols, aminoalcohols, ketones, and cellosolves. Poor solvent may be selected from the group consisting of water, hydrocarbons, halogenated hydrocarbons, ethers and diethers.

The near-infrared insensitive composition can be transformed into the near-infrared sensitive form by treating with a solvent or with a solvent vapor, wherein the solvent has the relatively low solubilizing power to the phthalocyanine compared to that of good solvent.

Figure 4:
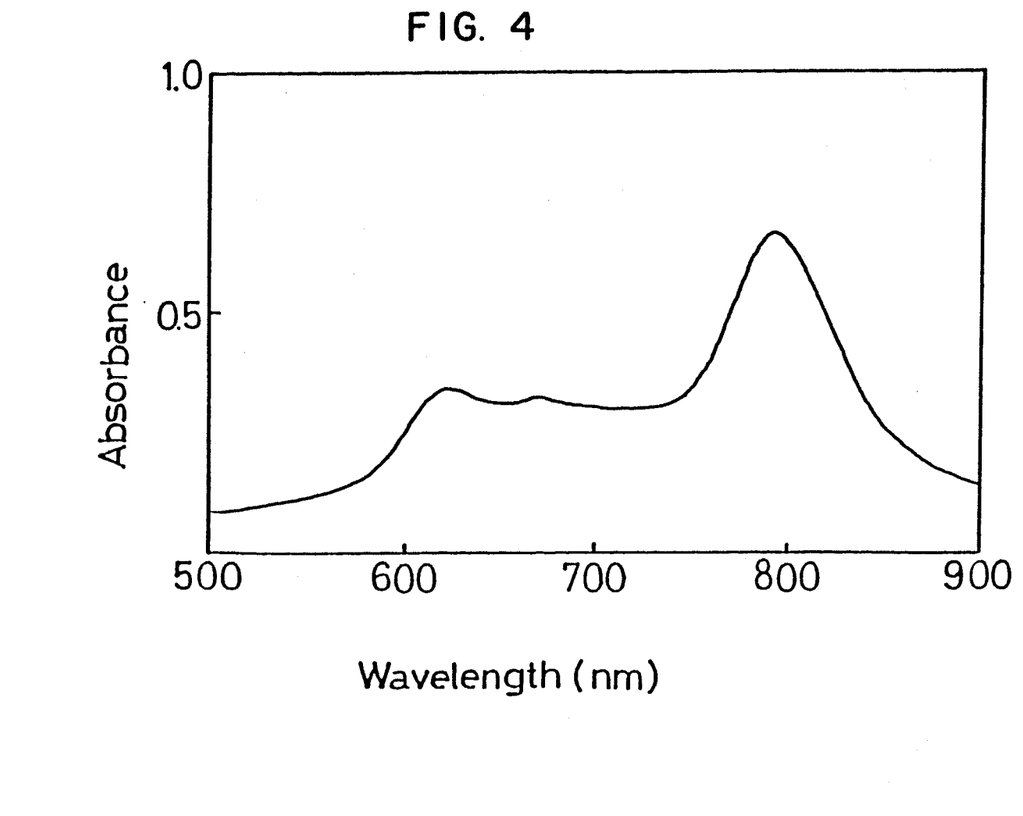
FIG. 4 shows a visible-near-infrared absorption spectrum of a chloroaluminum chlorophthalocyanine-acetyl cellulose composition obtained by ethyl alcohol vapor treatment of the chloroaluminum chlorophthalocyanineacetyl cellulose composition shown in FIG. 2.

For example, the near-infrared insensitive chloroaluminum chlorophthalocyanine-acetyl cellulose, once it was formed from the very good mutual solvent dimethylformamide (FIG. 2), was transformed into the near-infrared sensitive form by treating with ethyl alcohol vapor (FIG. 4). Here, it is our belief that the ethyl alcohol softened the matrix polymer, acetyl cellulose, and induced the formation of dimers or dimer aggregates of the chloroaluminum chlorophthalocyanine since ethyl alcohol is a moderately good solvent having lower solubilizing power than that of dimethylformamide for chloroaluminum chlorophthalocyanine.

A double layer of a substituted aluminum phthalocyanine and a polymer can be made into a near-infrared sensitive single layer by treating with a solvent or with a solvent vapor, wherein the solvent has a relatively low solubilizing power compared to that of good solvent.

A double layer of chloroaluminum phthalocyanine and poly(vinylalcohol), wherein the phthalocyanine layer was formed by vapor-deposition and the polymer layer by coating of aqueous solution, was fabricated on a transparent glass substrate. The double layer did not show strong absorption in the near-infrared wavelength spectrum. The double layer could be successfully made into a single layer by treatment with the vapor of a mixed solvent of ethyl alcohol and water (1:1 in volume). The resultant single layer had an intense absorption in near-infrared wavelengths.

The thickness of the near-infrared insensitive composition or the double layers which can be converted into the near-infrared sensitive composition by the solvent treatment methods is preferably less than 3 microns, more preferably less than 1 micron, and most preferably less than 0.5 microns, since the solvent must diffuse into the composition or into the double layer to make a homogeneous and wet composition to induce formation of dimers and/or dimer aggregates of the phthalocyanine.

The formation of dimers and/or dimer aggregates of substituted aluminum phthalocyanine in a near-infrared sensitive composition was investigated by us and is evidenced by Fourier Transform Infra-Red and Thin Film X-ray Diffraction analyses.

The near-infrared insensitive chloroaluminum chlorophthalocyanine-acetyl cellulose composition (FIG. 2) showed an aluminum-chlorine stretching band at 440 cm$^{-1}$ in Fourier Transform Infra-Red absorption spectrum and substantially no diffraction peaks due to crystalline phthalocyanine in the X-ray diffraction spectrum. The result means that the present near-infrared insensitive composition contains exclusively a monomeric form of chloroaluminum chlorophthalocyanine.

The near-infrared sensitive chloroaluminum chlorophthalocyanine-acetyl cellulose composition (FIG. 4) did not show the aluminum-chlorine stretching band at 440 cm$^{-1}$ in Fourier Transform Infra-Red absorption spectrum. Instead, the composition showed new absorption at 310 cm$^{-1}$ which is ascribed to phthalocyanine ring deformation band. And, substantially no diffraction peak due to crystalline phthalocyanine in X-ray diffraction spectrum was observed. The result means that the present near-infrared sensitive composition contains exclusively dimers and/or dimer aggregates of chloroaluminum chlorophthalocyanine. We believe that the dimer has a face-to-face, chlorine-bridged structure.

To avoid formation of crystalline phthalocyanine in the composition, appropriate phthalocyanine concentration must be employed, although the appropriate phthalocyanine concentration depends on which substituted aluminum phthalocyanine, polymer and solvent are being used.

In the case where chloroaluminum phthalocyanine and poly(vinylalcohol) are being used, the concentration of the phthalocyanine is preferably less than 60% by weight of the composition, more preferably less than 40%, and most preferably less than 20%.

As already mentioned, the present near-infrared sensitive phthalocyanine-polymer compositions are highly absorbing in near-infrared wavelengths. The absorbed energy is capable of being used in some photochemical process if energy-accepting molecules are present (for example, sensitization) or is simply converted into heat.

The heat thus evolved can change optical properties of the phthalocyanine-polymer composition, namely, absorbance and/or reflectivity, by elevating the temperature of the composition above the $T_g$ (Glass Transition Temperature) of the polymer.

Figure 5:
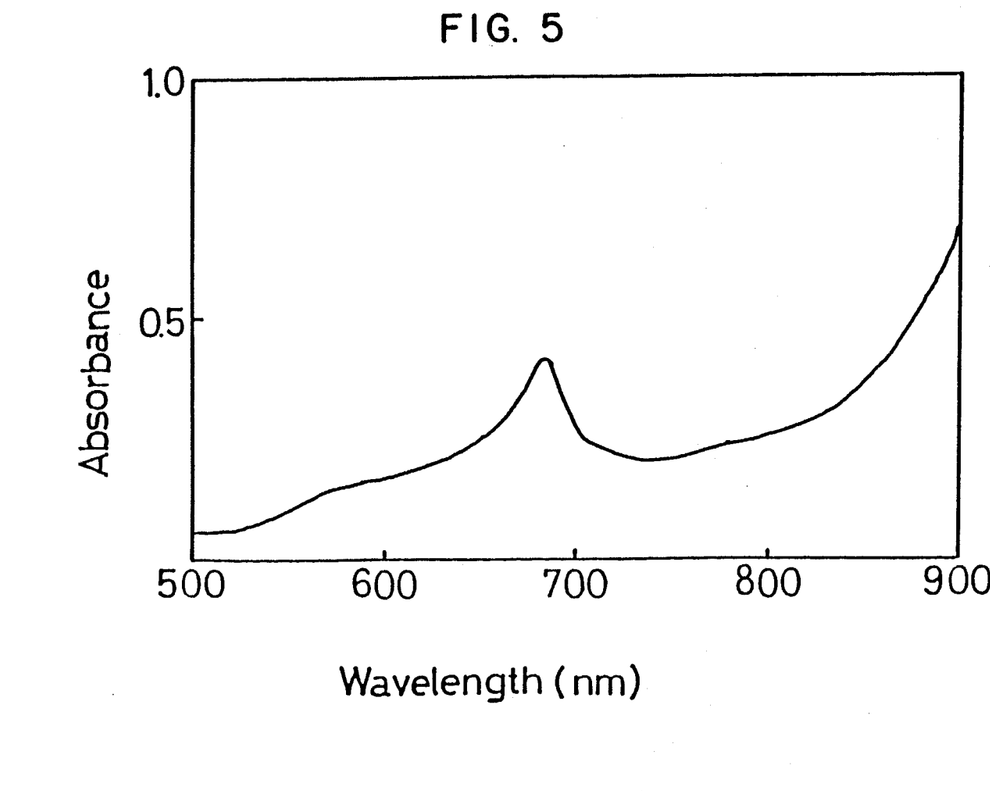
FIG. 5 shows a visible-near-infrared absorption spectrum of a chloroaluminum phthalocyanine-poly(vinylalcohol) composition after being heated between $T_g$ (Glass Transition Temperature) of said poly(vinylalcohol) and $T_f$ (Fixation Temperature). The absorption spectrum of the composition before heating is shown in FIG. 1.
Figure 6A:
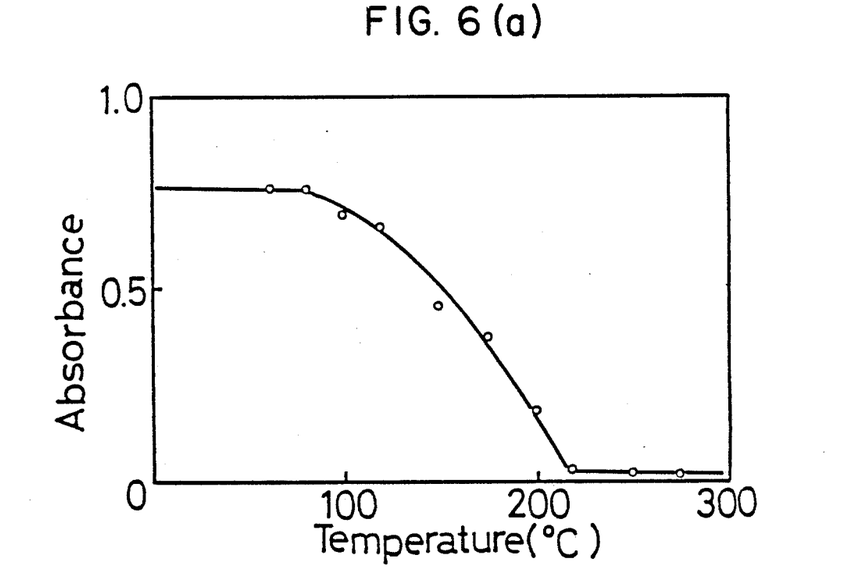
Figure 6B:
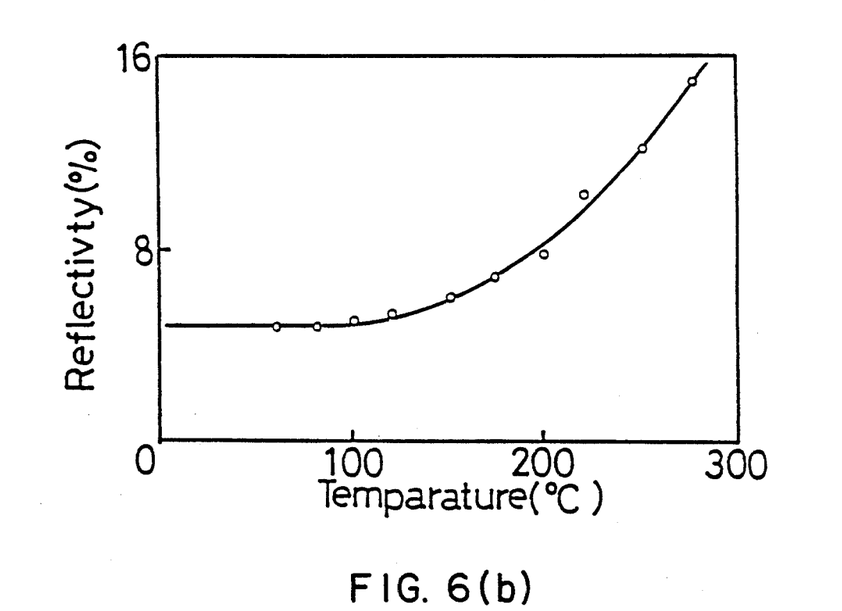
FIG. 6(b) shows the relationship between temperature and change of reflectivity at 830 nm, of a chloroaluminum phthalocyanine-poly(vinylalcohol) composition.

The chloroaluminum phthalocyanine-poly(vinylalcohol) near-infrared sensitive composition (FIG. 1) was heated above the $T_g$ of the poly(vinylalcohol). The absorption spectrum of the composition after heating is shown in FIG. 5. The strong absorption around 830 nm (FIG. 1) disappeared. This change of optical properties of the composition occurs only above the "threshold temperature" $T_g$. FIGS. 6 (a) and (b) show temperature dependences of changes of absorbance and reflectivity of the composition; here the $T_g$ of poly(vinylalcohol) is about 85° C.

Change of optical properties of phthalocyaninepolymer compositions is found to occur through the destruction of the dimer structure of the phthalocyanine. The absorption at 310 cm$^{-1}$ due to the dimer structure disappeared after heating above the $T_g$ of the polymer.

To fix this change of optical properties of the composition, it is required to elevate the temperature above a certain temperature $T_f$ (Fixation Temperature) which is higher than the $T_g$ of the polymer. This change of optical properties is reversible if the composition is heated to a temperature between $T_g$ and $T_f$. For poly(vinylalcohol), $T_f$ was found to be about 150° C.

Figure 7:
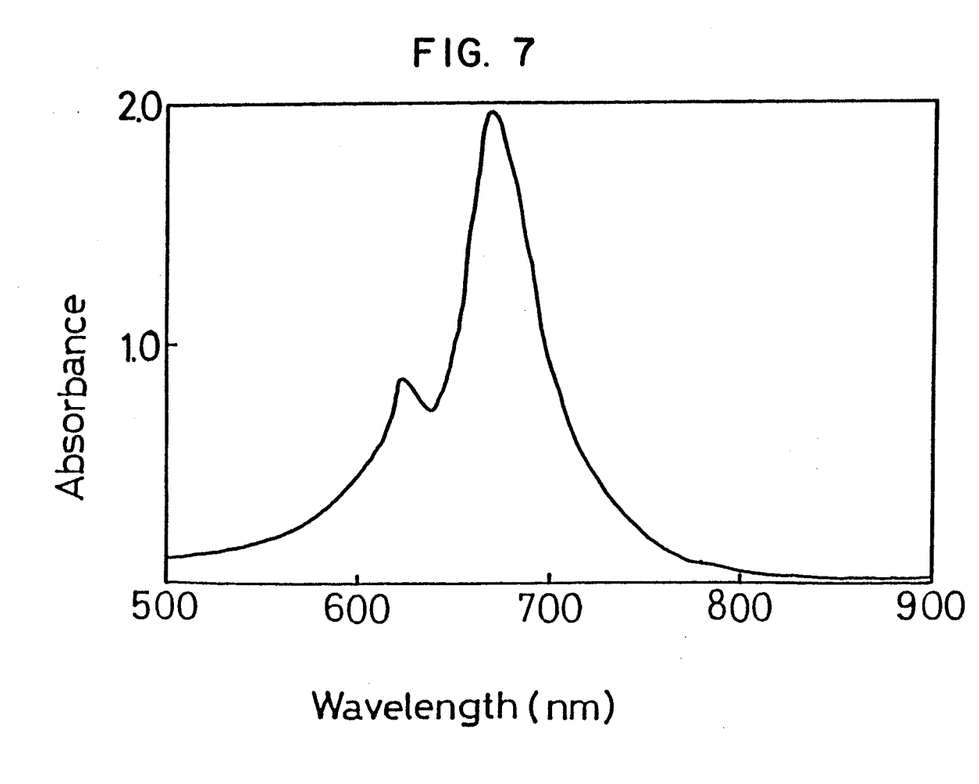
FIG. 7 shows a visible-near-infrared absorption spectrum of a chloroaluminum phthalocyanine-poly(vinylalcohol) composition after being heated above $T_f$ (thermal fixation temperature).

The absorption spectrum of the chloroaluminum phthalocyanine-poly(vinylalcohol) composition heated at 200° C. showed the absorption of monomeric phthalocyanine around 680 nm and small absorption of crystalline phthalocyanine in some crystal form around 640 nm (FIG. 7).

Two mechanisms of thermal fixation of change of optical properties of the phthalocyanine-polymer composition are apparently co-existing; the ratio of these depends on concentration of the phthalocyanine in the composition.

It is conceivable that the monomeric phthalocyanine observed after the thermal fixation of the change of optical properties (FIG. 7) is chemically bound to the polymer, since this monomeric phthalocyanine could not be extracted with solvents.

After the thermal fixation, the composition becomes insoluble to a solvent. For example, the chloroaluminum phthalocyanine-poly(vinylalcohol) composition heated at 200° C. (FIG. 7) was found to be insoluble in the mixed solvent of ethyl alcohol and water (1:1 in volume) which was used to prepare the original composition.

Thus, the phthalocyanine-polymer compositions are useful as near-infrared sensitive photoresists which give negative images when they are exposed to near-infrared laser light having such energy that elevates temperature of the exposed part of the composition above $T_f$. If excess laser beam energy is applied to the composition, then ablation occurs. In such case, the composition, in turn, is regarded as a near-infrared photoresist of a positive type. The phthalocyanine-polymer compositions, both of unheated and heated to cause thermal fixation are very stable to temperature (when unheated below $T_g$) and to light.

Chloroaluminum phthalocyanine-poly(vinylalcohol) composition before and after exposure to 830 nm laser beam, which could have caused thermal fixation of change of optical properties, showed only a 2% additional change of optical properties after being left in an environment of 60° C. and 90% relative humidity for 1000 hours.

The result ensures that the present near-infrared sensitive phthalocyanine-polymer compositions are invaluable and useful as archival optical information media.

Figure 8:
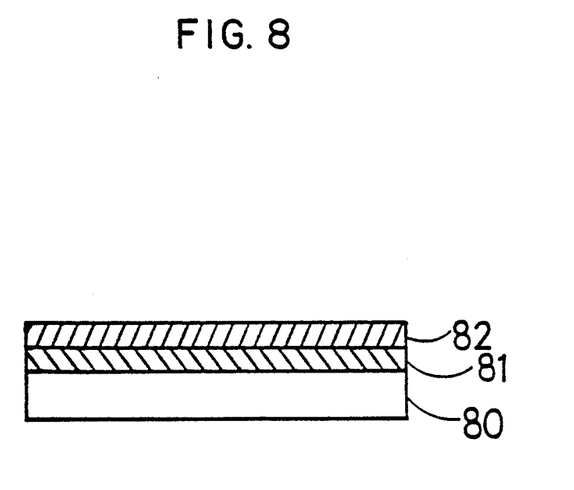
FIG. 8 shows a cross sectional view of an optical information recording medium containing a chloroaluminum chlorophthalocyanine-poly(vinylalcohol) recording layer.

FIG. 8 shows a cross sectional view of a preferred embodiment of such an optical information recording medium containing a substrate 80; near-infrared sensitive phthalocyanine-polymer recording layer 81; and a reflecting layer 82.

The phthalocyanine-polymer optical information recording media have probably some other advantages:

(a) these media do not require the air-sandwiched structure of the usual optical recording disk, since these are not ablative but a phase-change type. (If excess laser beam energy is given to the medium, the medium, in turn, becomes an ablative type medium.), and (b) recorded information on the media can be read out both in transmission and in reflection in near-infrared wavelengths by means of solid state diode lasers.

The invention will be further illustrated by the following preferable embodiments, but the invention is not intended to be limited to the details described therein.

DESCRIPTION OF THE PREFERRED EMBODIMENTS

Example 1

0.05 g of chloroaluminum phthalocyanine and 0.5 g of poly(vinylalcohol) (Nihon Gohsei Kagaku, GOHSENOL KP-06: $M_w$:30,000, saponified in 71 to 75%) were dissolved into 9.5 g of a mixed solvent of ethyl alcohol and water (1:1 in volume) by vigorous stirring and ultrasonic agitation. The resultant solution was filtered through a Teflon membrane filter of 1 micron pore size (Toyo Roshi), then spin coated on a glass substrate at spin rates of 1000 rpm for 20 sec and then 2000 rpm for 20 sec. A clear, smooth and continuous film was obtained after drying at 60° C. for 5 min. The thickness of the film was about 1.0 micron.

FIG. 1 shows an absorption spectrum of the film. A strong absorption peak was observed around 830 nm with absorption co-efficient of about $9 \times 10^4$ liter.-mole$^{-1}$.cm$^{-1}$ calculated for the dimer.

Then the film was heated for 10 min., and relationships between temperature and change of absorbance at 830 nm (FIG. 6 (a)) or between temperature and change of reflectivity at 830 nm (FIG. 6 (b)) were obtained.

As clearly seen in FIGS. 6, the changes of absorbance and reflectivity reflected the "threshold temperatures". Here it is about 85° C., which is the $T_g$ of poly(vinylalcohol) used.

An absorption spectrum of the film heated at 100° C. is shown in FIG. 5, where the strong absorption around 830 nm has disappeared.

An absorption spectrum of the film heated at 200° C. is shown in FIG. 7. Prolonged heating or heating at higher temperature than 200° C. could not substantially change the absorption spectrum any further.

Then two films, one as prepared and the other heated above 200° C., were exposed to an environment of 60° C. and 90% relative humidity for 1000 hrs. Neither of them showed a chnnge in optical properties more than 2% of the original amount.

Example 2

Following generally Example 1, except that 0.1 g of chloroaluminum chlorophthalocyanine was used, a film of the phthalocyanine-poly(vinylalcohol) composition was prepared on a glass substrate. In absorption spectra, the films, as prepared and heated, showed almost the same behavior as the films of the chloroaluminum phthalocyanine-poly(vinylalcohol) composition of Example 1.

Example 3

Following generally Example 1, except that 0.05 g of hydroxyaluminum phthalocyanine was used, a film of the hydroxyaluminum phthalocyanine-poly(vinylalcohol) composition was prepared on a glass substrate. The absorption spectrum of the film as prepared was almost the same as that of the film of chloroaluminum phthalocyanine-poly(vinylalcohol) composition (Example 1).

Example 4

Following generally Example 1, except that 0.05 g of acetoxyaluminum phthalocyanine was used, a film of the acetoxyaluminum phthalocyanine-poly(vinylalcohol) composition was prepared on a glass substrate. The absorption spectrum of the film as prepared was different only in the magnitude of absorption from that of the film of chloroaluminum phthalocyanine-poly(vinylalcohol) composition (Example 1).

Example 5

Following generally Example 1, except that 0.05 g of bromoaluminum phthalocyanine was used, a film of the bromoaluminum phthalocyanine-poly(vinylalcohol) composition was prepared on a glass substrate. In absorption spectra,the films, as prepared and heated, showed almost the same behavior as the films of chloroaluminum phthalocyanine-poly(vinylalcohol) composition (Example 1).

Example 6

Following generally Example 1, except that 0.5 g of hydroxyethyl cellulose was used, a film of the chlroloaluminum phthalocyanine-hydroxyethyl cellulose composition was prepared on a glass substrate. In absorption spectra, the films, as prepared and heated, showed almost the same behavior as the films of chloroaluminum phthalocyanine-poly(vinylalcohol) composition (Example 1).

Example 7

Following generally Example 1, except that 0.5 g of poly(N-vinylpyrrolidone) was used, a film of the chloroaluminum phthalocyanine-poly(N-vinylpyrrolidone) composition was prepared on a glass substrate. The film showed almost the same absorption as that of the film of chloroaluminum phthalocyanine-poly(vinylalcohol) composition (Example 1).

Example 8

Following generally Example 1, except that 0.5 g of poly(4-vinylpyridine) was used, a film of the chloroaluminum phthalocyanine-poly(4-vinylpyridine) composition was prepared on a glass substrate. The film showed almost the same absorption as that of the film of chloroaluminum phthalocyanine-poly(vinylalcohol) composition (Example 1). The "threshold" temperature of thermal fixation of change of optical properties in this polymer is about 250° C., much higher than that in poly(vinylalcohol).

Example 9

0.1 g of chloroaluminum chlorophthalocyanine and 0.5 g of poly(vinylalcohol) were dissolved into 9.5 g of a mixed solvent of dimethylformamide and water (1:1 in volume). The resultant solution was filtered through Teflon membrane filter of 1 micron pore size, then spin coated on a glass substrate at spin rates of 1500 rpm for 20 sec and then 3000 rpm for 20 sec. A clear, smooth and continuous film was obtained after dry at 60° C. for 5 min. The thickness of the film was about 0.5 microns.

An intense absorption around 830 nm was observed as shown in FIG. 3.

The thermal behavior of this film was completely the same as those of the films prepared in Example 1, meanig that the optical and thermal properties of the phthalocyanine-polymer composition are little affected by the kinds of solvent used in preparation.

Example 10

0.1 g of chloroalumium chlorophthalocyanine and 0.5 g of poly(saccharide) (pullulan, Nakarai Chem., Mw: 200,000) were dissolved into 9.5 g of a mixed solvent of dimethylformamide and water (80:20 in volume), and a film of the chloroaluminum chlorophthalocyaninepoly(saccharide) composition was prepared on a glass substrate by following the procedures in Example 1.

An intense absorption around 830 nm was observed.

Example 11

0.2 g of chloroaluminum chlorophthalocyanine and 0.2 g of poly(vinylalcohol) were stirred and dissolved into 9.5 g of dimethylformamide, some of the phhalocyanine remained insoluble. A film of the chloroaluminum chlorophthalocyanine-poly(vinylalcohol) composition was prepared on a glass substrate by following the procedures in Example 1. The thickness of the film was about 0.3 microns.

An absorption around 830 nm was not observed.

The film having an intense absorption around 830 nm was obtained by ethyl alcohol vapor treatment for 30 min.

The thermal behavior of this film was completely same as that of the film prepared in Example 1.

Example 12

0.2 g of chloroaluminum chlorophthalocyanine and 0.2 g of acetyl cellulose were stirred and dissolved into 9.5 g of dimethylformamide, some of the phthalocyanine remained insoluble. A film of the chloroaluminum chlorophthalocyanine-acetyl cellulose composition was prepared on a glass substrate by following the procedures in Example 1. The thickness of the film was about 0.4 microns.

An absorption around 830 nm was not observed (FIG. 2).

The film having an intense absorption around 830 nm was obtained by ethyl alcohol vapor treatment for 30 min. (FIG. 4).

The thermal behavior of this film was very similar to that of the film prepared in Example 1.

Example 13

Chloroaluminum phthalocyanine was charged to a vessel made of molybdenum or tungsten. The vessel was placed in a vacuum chamber and then connected to a source of current. A glass substrate was placed just above a evaporation vessel. The vacuum chamber was evacuated to about $10^{-5}$ torr. Current was applied to the vessel to raise the temperature to about 500° C. Evaporation of chloroaluminum phthalocyanine was continued until the thickness reached 1000 angstroms with a deposition rate of about 5 angstroms.sec$^{-1}$. Deposition was monitored with a quartz oscillator thickness sensor.

The vapor-deposited chloroaluminum phthalocyanine film did not have an intense absorption in wavelengths longer than 800 nm.

The film was over-coated with poly(vinylalcohol) thin film of 2500 angstroms thickness which was formed by spin coating an aqueous solution of poly(vinylalcohol) (2.5 weight %). This over-coated, thus double layered film again did not show a strong absorption in near-infrared wavelengths.

The over-coated film was exposed to a vapor of a mixed solvent of ethyl alcohol and water (1:1 in volume) for 30 min. The resultant film had a strong absorption around 830 nm. Thermal and optical properties of the film was almost same as those of the film prepared in Example 1.

The vapor-treated film was found to be a single layer of the aluminum phthalocyanine-poly(vinylalcohol) composition, since the film was completely soluble and removable with water.

Example 14

Following generally Example 1, except that a bar-coater was used instead of spin coater, a film of the chloroaluminum phthalocyanine-poly(vinylalcohol) composition was prepared on a glass substrate. The thickness of the film was about 1 micron.

The film showed essentially the same absorption except for intensity as that of the film of chloroaluminum phthalocyanine-poly(vinylalcohol) composition prepared in Example 1.

The film was subjected to exposure to a focused and pulsed laser beam of 830 nm which was emitted from gallium aluminum arsenide laser. The exposure was performed with a laser output power of about 2 mW and with about 200 nanoseconds exposure time.

The film was rinsed with water after exposure. The part of the film exposed to laser beam was insoluble, while the unexposed part was soluble. As a result, negative images were developed.

When the exposure was done with a laser output power of about 7 mW, the exposed part of the film was grooved. Thus, positive images were obtained without development.

Example 15

0.1 g of chloroaluminum chlorophthalocyanine and 0.5 g of poly(vinylalcohol) were dissolved into 9.5 g of a mixed solvent of ethyl alcohol and water (60:40 in volume) by vigorous stirring and ultrasonic agitation. The resultant solution was filtered through a Teflon membrane filter of 0.2 micron pore size, then spin coated on a poly(methylmethacrylate) substrate of 1.2 mm thickness at spin rates of 4000 rpm for 20 sec and then 5000 rpm for 20 sec. A clear, smooth and continuous film was obtained after drying at 60° C. for 5 min. The thickness of the film was about 0.2 microns.

The film had an intense absorption in near-infrared wavelengths, absorption maximum at 830 nm with absorbance of 0.25.

An aluminium reflective layer of 800 angstroms thickness was vapor-deposited onto the chloroaluminum chlorophthalocyanine-poly(vinylalcohol) film to give the optical recording medium shown in FIG. 8.

The optical recording medium thus obtained was subjected to exposure to a focused and pulsed laser beam of 830 nm which was emitted from gallium aluminum arsenide laser. The exposure was performed through the substrate with a laser output power of about 2 mW and about 200 or 500 nanoseconds exposure time. The reflectivity of the exposed part of the optical recording medium was monitored to know whether recording was successful.

The exposed part of the optical recording medium showed marked increase in reflectivity, which means that the absorption at 830 nm of the exposed part was decreased, thus increasing the out-coming reflection from the aluminum reflective layer.

The optical recording media before and after exposure to the laser beam showed only 2% of additional change in optical properties after being left in an environment of 60° C. and 90% relative humidity for 1000 hrs.

Example 16

0.2 g of chloroaluminum chlorophthalocyanine and 0.2g of acetyl cellulose were dissolved into 9.5 g of dimethylformmmide. Some of the phthalocyanine remained insoluble. The resultant solution was filtered through a Teflon membrane filter of 0.2 micron pore size, then spin coated on a glass substrate of 1.2 mm thickness at spin rates of 2000 rpm for 20 sec and then 4000 rpm for 20 sec. A clear, smooth and continuous film was obtained after dry at 100° C. for 5 min. The thickness of the film was about 0.25 microns.

An intense absorption around 830 nm was not observed.

The film having an intence absorption around 830 nm was obtained by ethylalcohol vapor treatment for 30 min.

The film had both an intence absorption and reflection in near-infrared wavelengths. Absorption maximum was at 830 nm with absorbance of 0.45 and reflectivity at 830 nm was about 21% which was high enough to be able to focus the laser beam on the film.

The film was subjected to exposure to a focused and pulsed laser beam of 830 nm which was emitted from gallium aluminum arsenide laser. The exposure was performed through the substrate with a laser output power of about 2 mW or 7 mW and about 500 nanoseconds exposure time. Reflectivity of the exposed part of the optical recording medium was monitored to know whether recording was successful.

The part of the optical recording medium exposed to 2 mW laser beam showed an increase in reflectivity. The part of the optical recording medium exposed to 7 mW laser beam showed a marked decrease in reflectivity; decreased from 21% to 7%. The exposed part turned out to be ablated by observation with a microscope. The optical recording media before and after exposure to the laser beam showed only 2% of additional change of optical properties after being left in an environment of 60° C. and 90% relative humidity for 1000 hrs.

What is claimed is:

1. A near-infrared sensitive phthalocyanine-polymer substantially homogenous information recording composition capable of recording without ablation polymer and a substituted aluminum phthalocyanine, wherein non-crystalline substituted aluminum phthalocyamine dimers and/or dimer aggregates which are responsible for the near-infrared sensitivity are formed in the composition.

2. A near-infrared sensitive phthalocyaninepolymer composition as in claim 1, wherein the substituted aluminum phthalocyanine has the formula wherein X is selected from the group consisting oof chlorine bromine, hydroxy, alkoxy from $C_1$ to $C_4$ or carbonyloxy from $C_1$ to $C_4$, and $Y_1$, $Y_2$, $Y_3$ and $Y_4$ are selected from the group consisting of hydrogen, chlorine, bromine, hydroxy, alkyl from $C_1$ to $C_6$, hydroxyalkyl from $C_1$ to $C_6$, alkoxy from $C_1$ to $C_6$, amino, amide from $C_1$ to $C_6$, nitro, cyano and/or carbonyl from $C_1$ to $C_4$.

3. A near-infrared sensitive phthalocyaninepolymer composition as in claim 1, wherein said substituted aluminum phthalocyanine is chloroaluminum chlorophthalocyanine.

4. A near-infrared sensitive phthalocyaninepolymer composition as in claim 1, wherein said substituted aluminum phthalocyanine is bromoaluminum bromophthalocyanine.

5. A near-infrared sensitive phthalocyaninepolymer composition is in claim 1, wherein said polymer has at least one component which is capable of forming hydrogen bonding.

6. A near-infrared sensitive phthalocyaninepolymer composition as in claim 5, wherein said component which is capable of forming hydrogen bonding is a hydroxy group.

7. A near-infrared sensitive phthalocyanine-polymer composition as in claim 6, wherein said polymer is selected from the group consisting of poly(vinylalcohol), poly(vinylacetal), hydroxyalkyl cellulose, acetyl cellulose, poly(saccharide), poly(vinylpyridine), poly(vinylpyrrolidone), polyepoxide, poly(bis-epoxide), polyurethane, polyamide, or their copolymer.

* * * * *

UNITED STATES PATENT AND TRADEMARK OFFICE
CERTIFICATE OF CORRECTION

PATENT NO. : 4,816,386
DATED : March 28, 1989
INVENTOR(S) : Tetsuya GOTOH et al.

It is certified that error appears in the above-identified patent and that said Letters Patent is hereby corrected as shown below:

Col. 5, line 12, change "imortant" to --important--.

Col. 9, line 4, change "chnnge" to --change--.

Col. 10, line 43, change "phhalocyanine" to --phthalocyanine--.

Claim 1, line 3, after "ablation", insert --comprising a--;

line 5, change "phthalocyamine" to --phthalocyanine--.

Claims 2-6, line 1 of each, change "phthalocyaninepolymer" to --phthalocyanine-polymer--.

Claim 2, first line under structural formula, change "oof" to --of--.

Claim 5, line 2, change "is" to --as--.

Signed and Sealed this

Twenty-first Day of November, 1989

*Attest:*

JEFFREY M. SAMUELS

*Attesting Officer*   *Acting Commissioner of Patents and Trademarks*